United States Patent [19]

Jacobi, Jr. et al.

[11] 4,309,874
[45] Jan. 12, 1982

[54] FUEL CELL POWERED IRRIGATION SYSTEM

[76] Inventors: Edgar F. Jacobi, Jr., 1027 Woodland Place, Menasha, Wis. 54952; Mark R. Madden, Rte. #2, Plainsfield, Wis. 54966

[21] Appl. No.: 128,041

[22] Filed: Mar. 7, 1980

[51] Int. Cl.³ ............................................... F01K 17/00
[52] U.S. Cl. ........................................ 60/648; 60/670; 239/721
[58] Field of Search ................ 60/643, 645, 648, 670, 60/721; 239/177, 710, 718, 721

[56] References Cited

U.S. PATENT DOCUMENTS 4,052,858 10/1977 Jeppson .............................. 60/648
4,087,976 5/1978 Morrow, Jr. et al. ............ 60/648 X Primary Examiner—Allen M. Ostrager
Assistant Examiner—Stephen F. Husar
Attorney, Agent, or Firm—I. Michael Bak-Boychuk

[57] ABSTRACT

Set out herein is a fuel cell power plant for use with irrigation systems wherein the fuel cell is utilized to generate electric current to drive a pump motor. This pump motor drives a first water pump which receives water for distribution through a traveling irrigation system, the output of the first pump first conveyed into a condenser heat exchanger connected to a steam engine or turbine cycle. The fuel cell itself is contained within a boiler assembly and the heat of production of the electric power is used to generate steam which is sent to the steam engine. In the course of cooling the condenser gases of the steam engine the irrigating water is passed through a second pump driven by the steam engine and it is through this second pump that the pressure is raised sufficiently to allow for the necessary spraying fans. To improve the condenser efficiency part of the condensate or the ullage thereof is connected to one of the spray heads on the irrigation system in a venturi nozzle which thereby lowers the back pressure thereof. The lower portion of the condenser or the liquid part thereof is fed back through yet another condenser pump to the boiler to be regenerated into steam.

4 Claims, 3 Drawing Figures

FUEL CELL POWERED IRRIGATION SYSTEM

BACKGROUND OF THE INVENTION

1. Field of the Invention

The present invention relates to fuel cell powered systems, and more particularly to a fuel cell powered pumping system adapted for use with traveling irrigation pipes.

2. Description of the Prior Art

Automatically irrigated farming has had prevailing acceptance in the recent past particularly as the more arid farming tracts are put to heavy production. With the advent of multiple growth cycle demands the old methods of relying on rain as the main source of irrigation have been abandoned and each of the more modern farming enterprises now engages in extensive mechanized irrigation. Mechanized irrigation, however, entails the use of energy which, at these times, also is in short supply. Typically farming tracts are irrigated by what is called center post irrigation systems and these irrigation systems require power both for the advancement thereof and for the pumping of irrigating water therethrough. During arid periods such center post irrigation systems are often put on a twenty-four hour cycle and operate continuously to maintain the growth. Since very frequently the power available for these irrigation systems comes from the local utility company such irrigation systems compete with the power demands of the urban areas, driving the energy prices up and frequently exceeding the supply capability in the local area. For this reason there has been a recent drive to render such irrigation systems independent of the local public utility and gasoline driven power plants have been locally installed.

One problem with gasoline cycles and the power generated by a utility is the lack of overall efficiency. For example, the typical fuel conversion efficiencies of a utility company are around thirty-five percent. Gasoline powered internal combustion engines are even less than that. Thus the farmer must either tolerate large increases in cost of energy or must tie himself to the availability of liquid fuel which is then to be used in inefficient ways. In both instances the volatile aspects of these supplies precludes effective predictability that is so necessary in performing trade which is often carried on the basis of future committments.

Unlike an automobile an irrigation system when powered by a local power plant operates over extended periods of times and therefore the stopping and starting transients are not significant in the course of operation thereof. Thus an irrigation system is particularly suitable for fuel cell use which is best utilized in its most efficient form when operating over extended periods of time. In addition the use of fuel cells in irrigation systems is uniquely appropriate in that vast amounts of water are available for the cooling thereof.

It is these exact features that are utilized to best advantage in the present invention.

SUMMARY OF THE INVENTION

Accordingly, it is the general purpose and object of the present invention to provide a fuel cell powered irrigation system which includes in the cycle thereof the recovery of the secondary heat loss entailed in the fuel cell process.

Other objects of the invention are to provide a fuel cell powered system for use in advancing irrigation pipes and to pump water therethrough.

Yet further objects of the invention are to provide a fuel cell powered irrigation system which includes provisions therein for secondary recovery of the heat generated in the course of combinations.

Yet further objects of the invention are to provide an irrigation system which operates on a steam cycle improved by way of venturi nozzles in the overall efficiency thereof.

Briefly these and other objects are accomplished within the present invention by providing a fuel cell which is deployed on the interior of a borderless steam generator, the fuel cell providing directly electric current to be used by a first pump. The first pump then advances the irrigating liquid from the irrigating supply to a condenser at the end of a steam turbine or a steam engine which is tied at its input to the boiler. This steam engine drives a second pump used to circulate the condensate of the condenser back into the boiler cavity and to advance the irrigating liquid to the next higher pressure as is required for the effective ejection thereof.

The foregoing arrangement is controlled for optimum efficiency by way of a logic system which senses the level of the condensate within the condenser and modifies the calculated pumping rate of condensate into the boiler according to this level.

DESCRIPTION OF THE SPECIFIC EMBODIMENT

Figure 1:
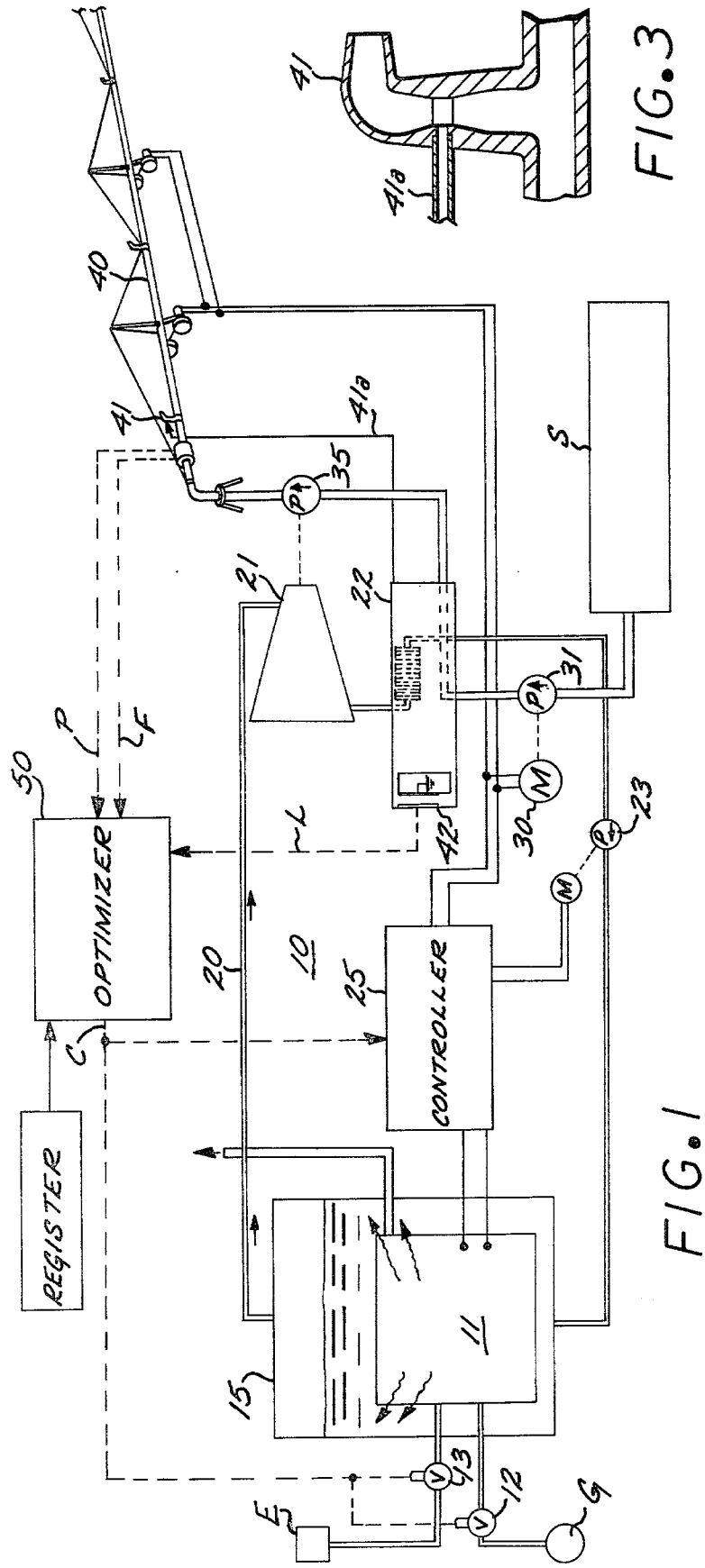
FIG. 1 is a diagrammatic illustration of a fuel cell powered system for use with traveling irrigation pipes.
Figure 3:
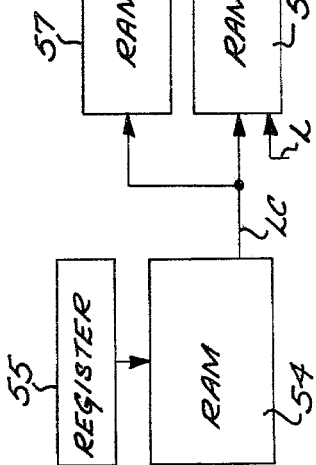
FIG. 3 is a sectional view of a venturi nozzle useful herein.

As shown in FIG. 1 a power plant, generally designated by the numeral 10, includes a fuel cell 11 of the type described in the prior art and particularly in U.S. Pat. No. 3,976,506 to Landau is connected to receive natural gas from a source G and air through a filter F delivered thereto across control valves 12 and 13 respectively. As is typical in fuel cells, the course of generating electricity therein is accompanied by the generation of waste heat and it is for that reason that the fuel cell 11 is contained within a boiler assembly 15. Boiler assembly 15 may include a quantity of water which is converted to steam at the ullage thereof and is delivered by way of a steam pipe 20 to a steam engine or turbine 21. This steam as it is used to power the engine or turbine is then received in a condenser 22 and the condensate therein is then pumped back by way of a pump 23 into the boiler 15. Motor 23 is driven, across a controller 25 by the DC output of the fuel cell 11. The same controller 25 also controls yet another DC motor 30 connected to a first water pump 31 connected to receive water from the water source S at the input thereof and conveying the water into the condenser 22 for heat exchange. At the output of condenser 22 the steam engine 21 drives yet another pump or a second pump 35 which then directs its flow to the input of the traveling pipe irrigation system 40. In order to reduce the ullage pressure within the condenser cavity the condenser 22 is connected by a vacuum line 41a to a venturi nozzle 41 on one of the sprinkler heads on the irrigation system

Figure 2:
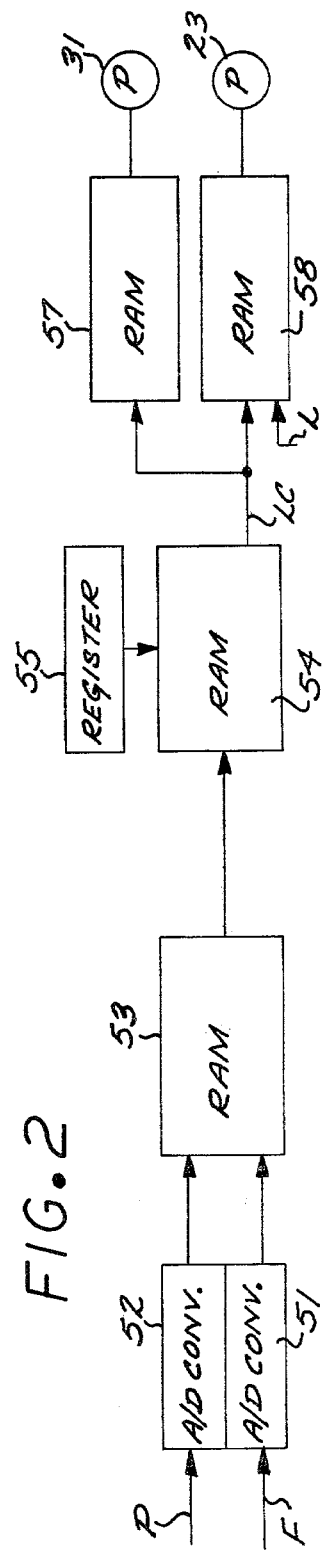
FIG. 2 is a logic diagram illustrating a control system useful with the invention herein.

40. This reduced ullage pressure will facilitate quicker vaporization of the condenser cooling liquid and therefore will ensure a better heat exchange. Disposed within condenser 22 is a level sensor 42 shown herein as a capacitive level sensor which produces a level signal to a flow controller and optimizer 50. This same flow controller and optimizer 50 also receives a pressure and a flow signal P and F respectively from the irrigation system 40 and it is these level pressure and flow signals that are used in combination according to the description following. The controller and optimizer 50, in turn, produces control signals C back to the motor speed controller 25 and to valves 12 and 13. It is through this feed back mode that a coherent combination of gas and air is achieved which matches the motor speed demand. As shown in FIG. 2 controller and optimizer 50 receives the flow signal F and the pressure signal P at the input of two analog to digital A to D converters 51 and 52 respectively. Converters 51 and 52 in parallel, provides a one address word indicative of the flow and the pressure to a RAM 53 loaded with a series of curves corresponding to the combination of pressure and flow. The output of the RAM lookup or the data output is loaded to yet another RAM 54 as one part of an address word which is combined with another address word from a register 55. RAM 54 provides a load coefficient LC signal at the location of each of the combined addresses which is used to regulate the speed setting of the first pump 31 and the condenser pump 23. More specifically, signal LC provides yet another address input to a RAM 57 which at that address provides the requisite speed setting. Similarly a RAM 58 is addressed by the signal LC to provide the speed setting for the condenser pump. In the RAM 58 a further modification to the address is achieved by way of the level signal L from the capacitive level sensor 42. Once more a A to D converter 59 is used to change the analog level signal L into digital form for this purpose. In the foregoing form the functions of the controller 25 and the optimizer 50 are combined in one single circuit RAM 53 being loaded with a plurality of look-up curves following the equasion $K_0 \times Q$, H where Q is the equivalent address of the flow signal F and the H is the equivalent digital address of the pressure P. This combination of signals is then linearly converted to the signals LC and RAM 54, to be further amplified by an amplification factor K1 in RAM 57 and to be combined or subtracted with a digital gain curve of the level signal and RAM 58.

Thus the fuel cell 11 is cooled by a pressurized boiler which produces steam for the operation of the steam engine or turbine 21. After expansion of the steam in the engine 21 the steam is condensed in condenser 22 which is cooled by the irrigating water and is evacuated in its ullage by the venturi nozzle 41. The foregoing combination of the low condensing temperature and low condensing pressure increases the efficiency of the steam cycle. More specifically by referring to the idealized carno efficiency computed as $(E+T1-T2/T1)$ where T1 is the absolute steam temperature of the boiler and T2 is the condensing temperature the efficiency increases as T2 decreases. The load carrying optimizer 50 directs the setting of the motor speed control such that the load on the fuel cell and the steam engine are balanced. Thus the overall efficiency is always maximum although the overall load may be varying.

By the foregoing arrangement an efficient system is provided which utilizes conventionally found gas or liquid fuel sources at efficiency levels substantially higher than that achieved in the public utility. This is particularly rendered possible because of the availability of irrigating water and particularly the low pressure conditions at the sprinkler heads.

Obviously many modifications and changes can be made to the foregoing description without departing from the spirit of the invention. It is therefore intended that the scope of the invention be determined solely on the claims appended hereto.

What is claimed is:

1. In an irrigation system including a source of pressurized irrigation water, a transportable pipe system connected to said source of irrigation water and adapted to translate over a preselected area of irrigated land, said pipe system including motorized supports for said translation, the improvement comprising:
   a fuel cell conformed to combine fuel and air for generating electrical excitation in the course thereof and heat by products associated with said combination;
   a boiler formed around said fuel cell for heating water by said heat by products and for producing steam therefrom;
   a steam driven power plant connected to receive the steam products from said boiler for producing a rotary output, said power plant including a condenser for condensing said steam;
   recirculating means connected between said condenser and said boiler for returning the steam condensate;
   a first pump connected to be powered by the electrical excitation from said fuel cell for conveying water from said source to the exterior of said condenser for exchanging heat thereat; and
   a second pump connected between the exterior of said condenser and said irrigation pipe system and driven by said rotary output for conveying water therebetween.

2. Apparatus according to claim 1 further comprising:
   control means connected to regulate said fuel and air to said fuel cell, and said first pump in response to the pressure a flow rate in said pipe system.

3. Apparatus according to claim 2 wherein:
   said condenser includes a conduit for communicating with the static pressure of said pipe system.

4. Apparatus according to claim 3 wherein:
   said recirculating means includes a pressurization pump.

* * * * *

UNITED STATES PATENT OFFICE
CERTIFICATE OF CORRECTION

Patent No. 4,309,874           Dated January 12, 1982

Inventor(s) Edgar F. Jacobi, Jr. and Mark R. Madden

It is certified that error appears in the above-identified patent and that said Letters Patent are hereby corrected as shown below:

Page 1, Item [76] Inventor Edgar F. Jacobi, Jr. address should be changed from "1027 Woodland Place, Menasha, Wis. 54952" to --- 5N 754 Jens-Jensen, St. Charles, Illinois 60174 ---.

Signed and Sealed this

Thirteenth Day of April 1982

|SEAL|

*Attest:*

*Attesting Officer*

GERALD J. MOSSINGHOFF

*Commissioner of Patents and Trademarks*